(12) United States Patent
Lu et al.

(10) Patent No.: US 10,936,688 B2
(45) Date of Patent: Mar. 2, 2021

(54) DYNAMICALLY ENHANCING QUERY RESULTS

(71) Applicant: International Business Machines Corporation, Armonk, NY (US)

(72) Inventors: Fang Lu, Billerica, MA (US); Nadiya Kochura, Bolton, MA (US); Janani Janakiraman, Austin, TX (US); Susan M. Cox, Rochester, MN (US); Daniel Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 16/158,405

(22) Filed: Oct. 12, 2018

(65) Prior Publication Data

US 2020/0117758 A1 Apr. 16, 2020

(51) Int. Cl.
*G06F 17/00* (2019.01)
*G06F 16/9535* (2019.01)
(Continued)

(52) U.S. Cl.
CPC .......... *G06F 16/9535* (2019.01); *G06N 5/02* (2013.01); *H04L 67/22* (2013.01); *H04L 67/306* (2013.01)

(58) Field of Classification Search
CPC .. G06F 16/9535; G06F 9/44505; G06F 11/34; G06F 16/9536; G06F 16/9538;
(Continued)

(56) References Cited

U.S. PATENT DOCUMENTS 8,145,659 B1* 3/2012 Smith .................. G06F 16/951
707/765
9,872,150 B2* 1/2018 Priness ................. H04W 4/029
(Continued)

OTHER PUBLICATIONS

Chunyang Chen et al., SimilarTech: Automatically Recommend Analogical Libraries Across Different Programming Languages, in Proceedings of the 31st IEEE/ACM International Conference on Automated Software Engineering. pp. 834-839, Aug. 2016.*
(Continued)

*Primary Examiner* — Greta L Robinson
(74) *Attorney, Agent, or Firm* — Heslin Rothenberg Farley & Mesiti P.C.; Noah Sharkan, Esq.

(57) ABSTRACT

A method, computer program product, and system for enhancing dynamically enhancing query results. A processor(s) monitors computing activities performed by a user, via a client. The processor(s) analyzes the computing activities to identify data comprising a user profile: elements relevant to the user and relationships. The processor(s) generates a knowledge graph with the data. The processor(s) obtains input from the user. The processor(s) executes one or more queries on one or more data sources to retrieve standard search results. The processor(s) analyzes the input and the search results to identify segments of the input and the search results relevant to items comprising the data in the graph and defines links between the items, the data, and the segments. The processor(s) generates contextual search results that include the standard search results, a portion of the items, and a portion of the links and transmits the contextual search results, to the client.

20 Claims, 8 Drawing Sheets

(51) Int. Cl.
*H04L 29/08* (2006.01)
*G06N 5/02* (2006.01)

(58) Field of Classification Search
CPC ........... G06F 16/90332; G06F 16/2425; G06F 16/24532; G06F 16/24575; G06F 16/337; G06F 16/338; G06F 16/435; H04L 67/22; H04L 67/306; H04L 43/00; G06N 5/02; G06Q 30/00
See application file for complete search history.

(56) References Cited

U.S. PATENT DOCUMENTS

| | | | |
|---|---|---|---|
| 2014/0136518 | A1 | 5/2014 | Shum et al. |
| 2014/0136546 | A1 | 5/2014 | Satalkar et al. |
| 2015/0363509 | A1* | 12/2015 | Maghoul ............... G06F 16/33 707/722 |
| 2016/0078133 | A1 | 3/2016 | Santhanam et al. |
| 2017/0032289 | A1 | 2/2017 | Tseng et al. |
| 2019/0005024 | A1* | 1/2019 | Somech ............... H04L 51/36 |
| 2019/0205839 | A1* | 7/2019 | Dotan-Cohen .... G06Q 10/1093 |

OTHER PUBLICATIONS

Peter Anick. Using Terminological Feedback for Web Search Refinement: a Log-Based Study. In Proceedings of the 26th Annual International ACM SIGIR conference on Research and development in informaion retrieval, Association for Computing Machinery, pp. 88-95, Jul. 2003.*

Mell et al., "The NIST Definition of Cloud Computing", National Institute of Standards and Technology, U.S. Dept. of Commerce, NIST Special Publ. 800-145, Sep. 2011, 7 pages.

* cited by examiner

DYNAMICALLY ENHANCING QUERY RESULTS

BACKGROUND

Question and answer software, referred to as Q&A software, enables users to access data without temporal and spatial constraints. The mechanism utilized in Q&A software (sometimes provided as a service) is that a user enters a question and an answer to the question is provided by another entity (user, expert, program, etc.), based on the knowledge of the entity. Existing Q&A software or services include: digital reference or virtual services, expert services, and social Q&A services. Digital reference or virtual services are online references that provide a user with an ability to look up answers to questions without the time and location constraints of physical libraries. Expert services offer answers in specific areas, generally, at a price. Social Q&A services enable users within a community to pose questions, which can be answered by additional users, within the community. Because of the community aspect of this software, Q&A software is frequently integrated by large and specialist corporations to allow their users, who work in similar fields, to discuss questions and provide answers to common and specialized questions. Some software development teams utilize Q&A software to coordinate development and support activities around a given project.

An advantage of utilizing a Q&A system to provide an answer, rather than soliciting answers from one or more individuals, even via a mailing list, is that Q&A software enables the users to receive answers to questions faster. Additionally, because Q&A software stores data received as both questions and answers, the Q&A software is effectively a search database that can provide and rank search results. Thus, user productivity can be improved through the utilization of a Q&A system.

SUMMARY

Shortcomings of the prior art are overcome and additional advantages are provided through the provision of a method for providing second search results to a user responsive to a query. The method includes, for instance: monitoring, by one or more processors, computing activities performed by a user, via a client, based on the client connecting, over a network, to one or more applications; analyzing, by the one or more processors, the computing activities performed by the user, in the one or more applications, to identify data comprising a profile for the user, wherein the data comprises elements relevant to the user and relationships between the elements and the user; generating, by the one or more processors, based on the analyzing, a knowledge graph, wherein the knowledge graph comprises the data; obtaining, by the one or more processors, via an application with an interface accessible on the client, via the interface, an input from the user; executing, by the one or more processors, based on the input, one or more queries on one or more data sources accessible to the one or more processors, to retrieve first search results responsive to the input; analyzing, by the one or more processors, the input and the first search results to identify segments comprising the input and segments comprising the first search results relevant to one or more items comprising the data in the knowledge graph, wherein the analyzing further comprises defining links between each item of the one or more items comprising the data in the knowledge graph and the identified segments; generating, by the one or more processors, second search results, wherein the second search results are responsive to the input, and wherein the second search results comprise the first search results, a portion of the one or more items, and a portion of the links; and transmitting, by the one or more processors, the second search results, to the client for display in the interface.

Shortcomings of the prior art are overcome and additional advantages are provided through the provision of a computer program product for providing second search results responsive to a query. The computer program product comprises a storage medium readable by a processing circuit and storing instructions for execution by the processing circuit for performing a method. The method includes, for instance: monitoring, by the one or more processors, computing activities performed by a user, via a client, based on the client connecting, over a network, to one or more applications; analyzing, by the one or more processors, the computing activities performed by the user, in the one or more applications, to identify data comprising a profile for the user, wherein the data comprises elements relevant to the user and relationships between the elements and the user; generating, by the one or more processors, based on the analyzing, a knowledge graph, wherein the knowledge graph comprises the data; obtaining, by the one or more processors, via an application with an interface accessible on the client, via the interface, an input from the user; executing, by the one or more processors, based on the input, one or more queries on one or more data sources accessible to the one or more processors, to retrieve first search results responsive to the input; analyzing, by the one or more processors, the input and the first search results to identify segments comprising the input and segments comprising the first search results relevant to one or more items comprising the data in the knowledge graph, wherein the analyzing further comprises defining links between each item of the one or more items comprising the data in the knowledge graph and the identified segments; generating, by the one or more processors, second search results, wherein the second search results are responsive to the input, and wherein the second search results comprise the first search results, a portion of the one or more items, and a portion of the links; and transmitting, by the one or more processors, the second search results, to the client for display in the interface.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
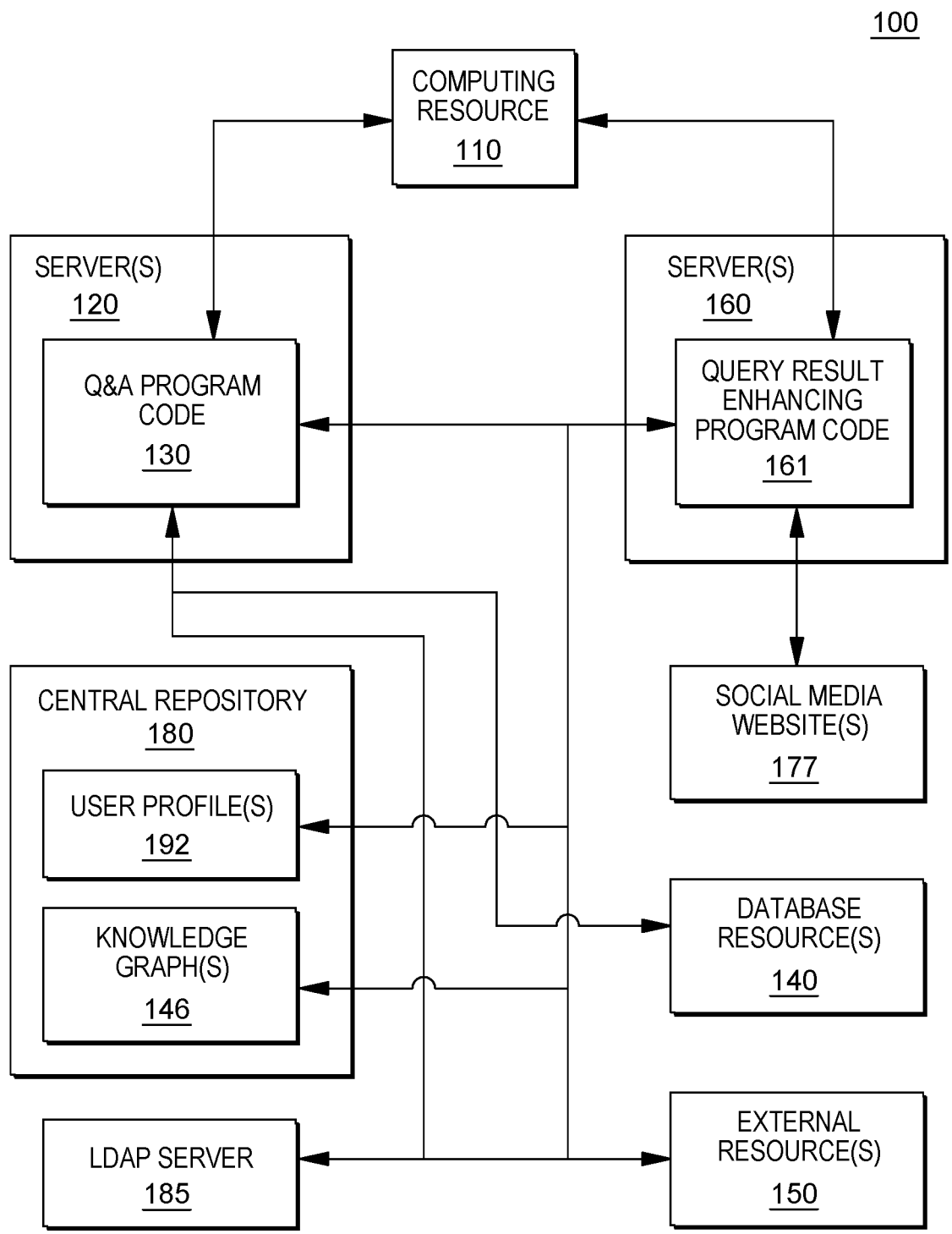
FIG. 1 is a technical environment into which certain aspects of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
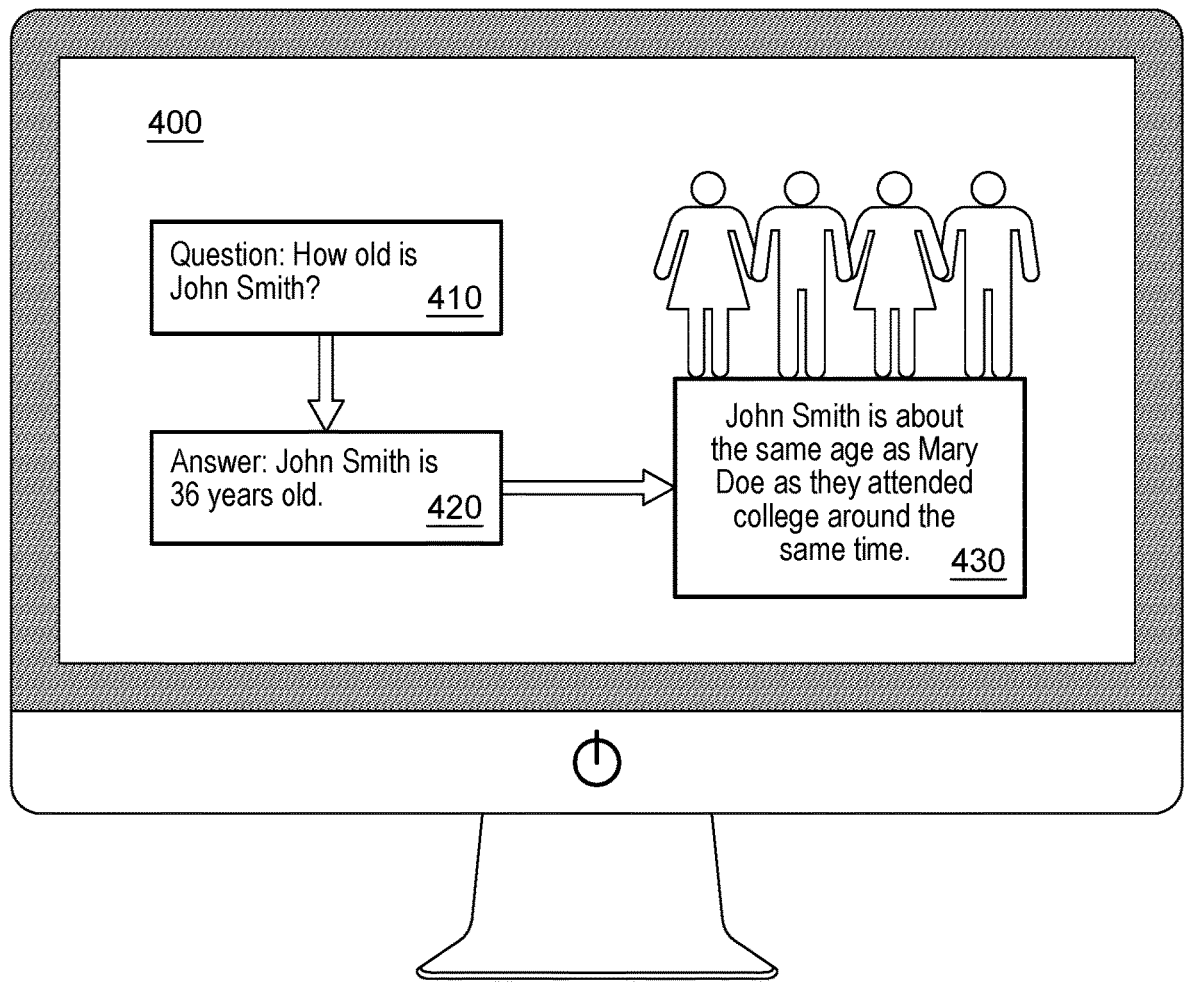
FIG. 4 is an illustration of various aspects of an embodiment of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computing system where program code executing on one or more processors dynamically enhances search results by providing contextual data relevant to an initial search, responsive to the initial search. Aspects of embodiments of the present invention can be implemented in a Q&A system to enhance the functionality and usability of this system. In some embodiments of the present invention, the program code: 1) analyzes user data to generate a knowledge graph (i.e., data structure) comprised of both data relevant to the user and relationships between these items of relevant data: 2) obtains a search query; 3) cognitively analyzes the query to extract key concepts; 4) locates certain of the key concepts in the knowledge graph; and 5) responsive to the query, returns contextual search results, where the context is supplied by data in the knowledge graph relevant to the certain key concepts. In some embodiments of the present invention, the user data may include, but is not limited to, profile information, search queries executed by the user, social media posts and content generated by the user. The data comprising the knowledge graph can include, but is not limited to, topics, activities, places, and/or identities of people familiar to the user. Thus, in some embodiments of the present invention, program code generates and displays (or otherwise provides) concepts and knowledge familiar to user with standard search results, in a Q&A system. In embodiments of the present invention, program code in a Q&A system dynamically enhances and provides personalized search results responsive to searches executed in the system.

Aspects of various embodiments of the present invention are inextricably tied to computing and provide significant advantages over existing Q&A systems. First, aspects of various embodiments of the present invention are inextricably tied to computing at least because these aspects can be implemented as enhancements to a Q&A system, and can provide enhanced search results to queries. The program code provides these enhanced search results, in part, by generating and maintaining data structures that include knowledge bases for various users, as well as relationships between known entities in the knowledge bases. The program code obtains data for the data structures (and generates the data structures) based on taking advantage of the interconnectivity of various computing systems, including Internet of Things (IoT) devices and personalized computing devices. Thus, aspects of embodiments of the invention are inextricably tied to computing at least because they represent enhancements to a system that is native to computing and exploit a computing infrastructure to provide this enhancement.

Second, aspects of various embodiments of the present invention present advantages over existing Q&A systems and systems that provide search results responsive to user queries. Some existing Q&A systems aim to increase the accuracy of search results by replacing the strings from the search terms with potential synonyms, in order to expand the search terms. However, this approach does not provide contextualized results like embodiments of the present invention where the program code enhances search results to be more easily comprehend by the user because the results are contextualized based on concepts, objects knowledge, and/or relationships, etc., familiar to the user. Another approach to provide links in search results, to allow a searcher to drill down for additional detail. However, this approach, unlike aspects of embodiments of the present invention, does not provide contextual results that are personalized to the user and allow the user to comprehend search results on a personal level. Another approach is to provide search results with referrals to experts on the subjects identified in the query, so that the user can take the inquiry off-line and ask these identified experts additional questions, directly. Again, this existing approach does not provide contextualized search results that are customized to the user, unlike the program code in various embodiments of the present invention. Finally, some existing approaches provide search results with additional visual content, in order to engage a user who submitted a query, but this approach does not customize the search results by providing personalized content, as the program code does in embodiments of the present invention.

FIG. 1 is a technical environment 100 into which various aspects of the present invention can be implemented. Embodiments of the present invention include program code executing on one or more processors which provides customized (contextualized) search results to a user, responsive to data entry on a computing resource 110, by the user. The program code that provides the enhanced query results is represented in FIG. 1 by query result enhancing program code 161, which is executing on at least one processing resource of a one or more servers 160.

In some embodiments of the present invention, query result enhancing program code 161 executing on at least one processing resource of a one or more servers 160 work in conjunction with an existing Q&A system, effectively customizing the resultant search results utilizing contextual information. In a traditional Q&A system, a user makes an entry on a computing resource 110, and the program code of the Q&A system 130, executing on one or more servers 120, obtains the entry and returns a search results, referred to herein as a standard search result. For example, a user can request directions from a first point to a second point, via entry through an interface of a computing resource 110. The program code of the Q&A system 130 obtains the entry and returns directions to the user, via an interface of the computing resource 110. These directions are considered a standard search result. The term standard search result, herein, is utilized to describe a search result that is provided without context or customization. By way of example, a user enters a request for directions from "10 Main St." to the "Standard Hotel." An example of a standard search result responsive to this request for directions appears below (and can be displayed by in the GUI of the computing resource 110 by the program code of the Q&A system 130, executing on one or more servers 120):

Directions from 10 Main St. to the Standard Hotel at 47 Hotel Ave.
Proceed NW on Main St. 16 miles.
Turn right off Main St. onto on Treetop Ave.
Proceed 15 miles on Treetop Ave.
Take a left off Treetop Ave. to Hotel Ave.
Proceed 5 miles and the Standard Hotel is on your right.

The program code of the Q&A system 130 can obtain the standard search results (e.g., the directions) from a variety of sources, depending upon the computing system into which aspects of embodiments of the present invention are implemented. For example, database resources 140 referenced by the program code of the Q&A system 130 to produce the standard search results can be part of a closed system (e.g., a proprietary maps database), and/or the program code of the Q&A system 130 can query external resources 150, including publicly available websites accessible, via the Internet, to respond to the request initiated at the computing resource 110.

In embodiments of the present invention, query result enhancing program code 161, executing on at least one processing resource of a one or more servers 160, enhances the standard results provided by the program code of the Q&A system 130. For clarity, in this technical environment 100, the program code of the Q&A system 130 and the query result enhancing program code 161 are illustrated as being separate programs, executing on separate resources. In some embodiments of the present invention, the program code of the Q&A system 130 is a third party system, with which the query result enhancing program code 161 communicates and exchanges data to produce the enhanced search results, responsive, in part, to the program code of the Q&A system 130 providing standard search results. In some embodiments of the present invention, the program code of the Q&A system 130 and the query result enhancing program code 161 are both proprietary aspects of the present invention. The configuration in FIG. 1 is provided merely as a non-limiting example and for clarity. The program code of the Q&A system 130 and the query result enhancing program code 161 can also execute on a shared resource and can comprise a common application, depending on the embodiment of the present invention.

As discussed above, in some embodiments of the present invention, query result enhancing program code 161 can be integrated into any existing Q&A system 130 and can also be utilized with proprietary Q&A system code. In embodiments of the present invention, the query result enhancing program code 161 utilizes standard search results returned by the program code of the Q&A system 130, as well as input received via the computing resource 110, including queries generated by the program code of the Q&A system 130 responsive to obtaining the input, to enhance search results provided to the user who provided input via the computing resource 110.

In embodiments of the present invention, query result enhancing program code 161 segments the input, queries generated by the program code of the Q&A system 130 responsive to obtaining the input, and/or the standard search results returned by the program code of the Q&A system 130 responsive to obtaining the input. The query result enhancing program code 161 produces contextual (customized) search results based on these segments. The contextual (customized) search results, which the query result enhancing program code 161 can return to the user (e.g., by displaying instead of or together with the standard search results in a graphical user interface (GUI) of the computing resource 110), are produced by the query result enhancing program code 161 based on the query result enhancing program code 161 relating the segments to contextual information related to the user and/or other users to which the user has relationships. In some embodiments of the present invention, various security and privacy controls manage the availability of data included in contextual (customized) search results provided to the user.

To relate the segments to contextual data, in embodiments of the present invention, the query result enhancing program code 161 generates a data structure that captures items related to the user and the relationships between these items. To that end, in order to generate contextual (customized) search results responsive to the input, in some embodiments of the present invention, the query result enhancing program code 161 continuously machine learns information about the user and models connections between the user and various entities. For example, in some embodiments of the present invention, the query result enhancing program code 161 maintains a user profile 170 for each user at a central repository 180. As understood by one of skill in the art, the universe of user profiles 192 maintained in a given central repository 180 can be limited by existing software and hardware-implemented constraints of the technical environment 100. For example, a Lightweight Directory Access Protocol (LDAP) server 185 can define a universe of users for which the query result enhancing program code 161 generates and maintains user profiles. The LDAP server 185 can also serve as a source for user profile data. In some embodiments of the present invention, rather than generate a user profile, the query result enhancing program code 161, with prior permissions and in compliance with security and privacy protocols of the technical environment 100, accesses existing user profiles, generated by users in third party software applications, such as social media websites 177. Whether the user profiles utilized by the query result enhancing program code 161 are maintained by the query result enhancing program code 161, locally, e.g., in a central repository 180, or generated on the fly based on accessing existing user profiles, including on social media websites 177, external data related to the user from external resources 150 accessible to the query result enhancing program code 161, can determine a portion of the contents of the user profile. For example, external resources 150 can also include an electronic calendaring system.

In embodiments of the present invention, the query result enhancing program code 161 utilizes, in a user profile that it generates or accesses, data relevant to the user that includes items or elements relevant to the user, and relationships between the elements and the user. As will be discussed in greater detail herein, to identify data relevant to a user profile, query result enhancing program code 161 can monitor and analyze the computing activities performed by the user, in the one or more applications executing on the computing resource 110, in remotely accessible applications, such as those executing on external resources 150, and on social media websites 177. In some embodiments of the present invention, users who desire to receive contextual (customized) search results can agree to this monitoring and data access and analysis. For example, in some embodiments of the present invention, the query result enhancing program code 161 can request, through a user interface of the computing resource 110, access to one or more social media profiles of the user. Based on the data relevant to the user (i.e., elements relevant to the user and relationships between the elements and the user), from a user profile (e.g., in a central repository 180 and/or accessed on external resources 150 and/or social media websites 177), the query result enhancing program code 161 generates a knowledge graph 146 for the user. A knowledge graph is a data structure that includes relationships between these various entities and their properties.

In some embodiments of the present invention, the query result enhancing program code 161 can generate a knowledge graph 146 for a given user on-the-fly, upon receiving an input from the user, via the computing resource 110, which triggers a response from the program code of the Q&A system 130. In some embodiments of the present invention, the query result enhancing program code 161 generated the knowledge graph 146 in advance of receiving the input from the user. In some embodiments of the present invention, the query result enhancing program code 161 generates and maintains (e.g., updates) a knowledge graph 146 for a given user in parallel with enhancing standard query results. These two functionalities can be asynchronous in some embodiments of the present invention. In some embodiments of the present invention, the query result enhancing program code 161 stores a knowledge graph 146 for a given user on a memory resource, such as central repository 180.

In some embodiments of the present invention, the query result enhancing program code 161 generates segments from the input, queries, and/or standard search results and produces contextual (customized) search results based on locating some of these segments in the knowledge graph of the user who provided the input. The query result enhancing program code 161 can segment the standard search results and the query itself and identify segments relevant to items comprising the data in the knowledge graph. The query result enhancing program code 161, in the illustrated embodiment, defines links between each item and data in the knowledge graph. Returning to the example of the request for directions from "10 Main St." to the "Standard Hotel" from the user, in this case, the query result enhancing program code 161 identifies data related to the segments "Treetop Ave", "Standard Hotel" and the geographic location where the "Turn right off Main St. onto on Treetop Ave" occurs, in the knowledge graph. Below is an example of data from the knowledge graph related to these particular segments.

Treetop Ave—Location of Joe's Little League game last Tuesday

Standard Hotel—Possible party venue for Ralph and Linda

Geographic location of "Turn right off Main St. onto on Treetop Ave"—In front of Ellen's Restaurant where Little League dinner was hosted last year.

Based on the data from the knowledge graph, the query result enhancing program code 161 provides the following contextual search results to the user:

Directions from 10 Main St. to the Standard Hotel at 47 Hotel Ave. (a Possible party venue for Ralph and Linda)

Proceed NW on Main St. 16 miles.

Turn right off Main St. onto on Treetop Ave (Location of Joe's Little League game last Tuesday).

Proceed 15 miles on Treetop Ave.

Take a left off Treetop Ave. to Hotel Ave. (when you see Ellen's Restaurant where Little League dinner was hosted last year).

Proceed 5 miles and the Standard Hotel is on your right.

Based on the implementation of aspects of the present invention in the technical environment 100, the manner in which the query result enhancing program code 161 provides the enhanced results (customized, contextual) to the user can vary. In some embodiments of the present invention, the query result enhancing program code 161 can display the enhanced results and the standard results together in a graphical user interface of the computing resource 110, utilizing graphical features to highlight the enhancements, visually.

Figure 2:
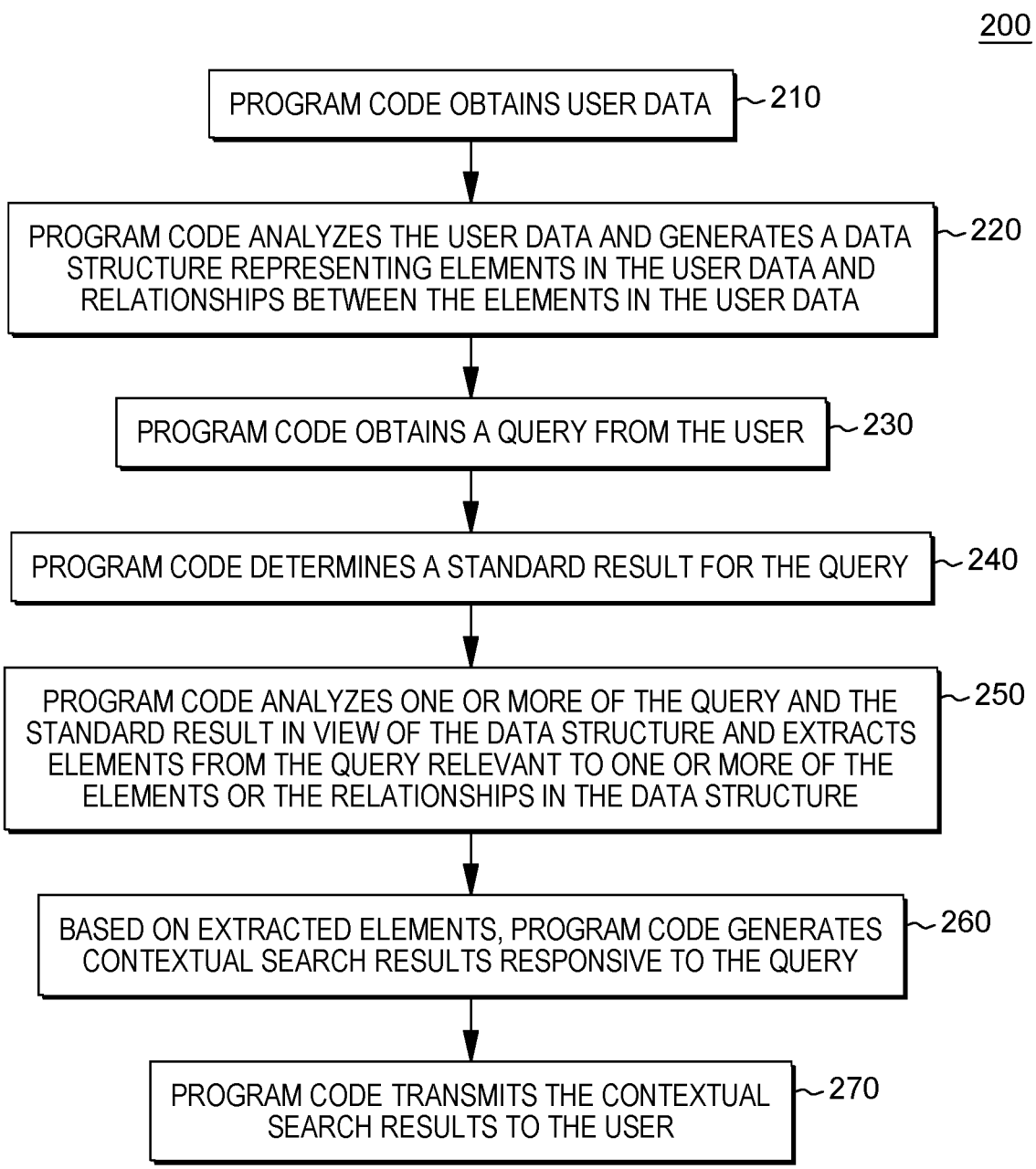
FIG. 2 is a workflow illustrating certain aspects of an embodiment of the present invention.
Figure 3:
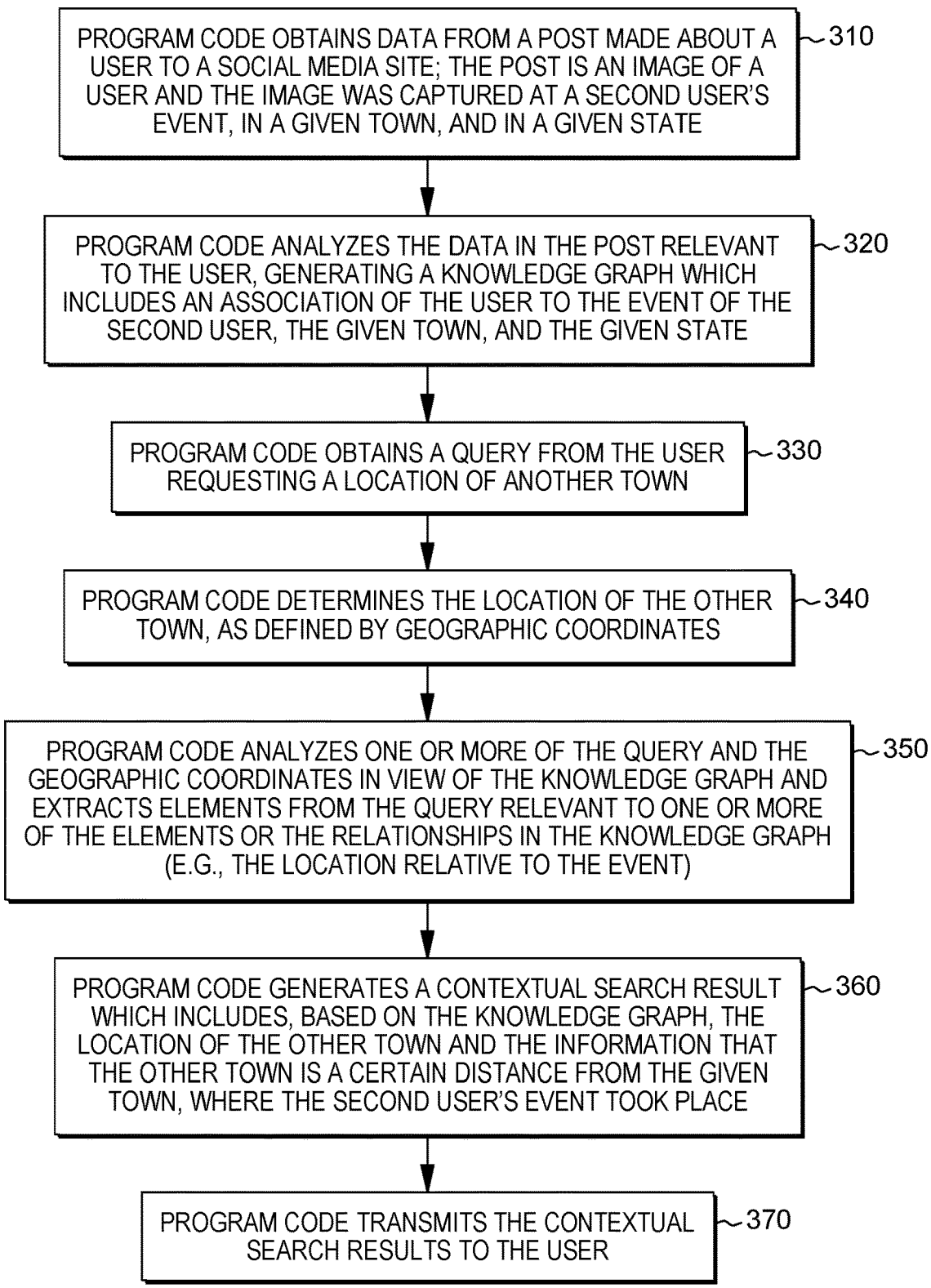
FIG. 3 is a workflow illustrating certain aspects of an embodiment of the present invention.

FIGS. 2-3 provide overviews of a first workflow 200 (FIG. 2) and of a second workflow 300 (FIG. 3) that illustrate various aspects of some embodiments of the present invention. FIG. 2 provides a general workflow 200 of certain aspects, although one (non-limiting) example is utilized to illustrate each generic aspect depicted. FIG. 3 applies these aspects to another specific (non-limiting) example, and depicts the example itself in the workflow 300, for illustrative purposes, only.

Referring to FIG. 2, in some embodiments of the present invention, program code obtains user data (210). As understood by one of skill in the art, a user can represent an entity, including, but not limited to, an agent, a service, a client, an authorized system user, an application, a computing resource, etc. In some embodiments of the present invention, the program code obtains user data and stores the data in one or more database as part of a user profile. In some embodiments of the present invention, the program code obtains user data from a user's social profile by monitoring a user's web activities. Privacy controls can provide the user with visibility to, and control over, what user data is collected and stored, and how such data is used, including the extent to which the data is subsequently used in building a personalized knowledge graph and returning contextual search results. A user profile can include, but is not limited to, information about the user's age, occupation, interests, hobbies, professional organizations, and attended educational institutions.

Returning to FIG. 2, the program code analyzes the user data and generates a data structure representing elements in the user data and relationships between the elements in the user data (220). For example, subject to privacy controls that can be set by the user and/or by an administrator, when the program code obtains user data based on monitoring the user's web-related activities, based on the data collected through this monitoring, the program code can generate a data structure, such as a personalized knowledge graph, based on the evaluating these activities. The program code, in this example, determines, based on the user's activities, that certain entities are known to or were discovered by the user, and the program code generates a knowledge graph (data structure) that includes relationships between these various entities and their properties.

Returning to FIG. 2, the program code obtains a query from the user (230). In obtaining a query from the user, the program code identifies the user, as the program code will provide search results that are personalized to the user and contextualized based on the knowledge of the user. In embodiments of the present invention aspects of the present invention are integrated into a Q&A system, including but not limited to, a Q&A system that utilizes IBM Watson® as the cognitive agent. IBM Watson® is a product of International Business Machines Corporation. IBM Watson® is a registered trademark of International Business Machines Corporation, Armonk, N.Y., US. In order to identify users, in some embodiments of the present invention, the program code monitors user entry of questions into a Q&A system.

In some embodiments of the present invention, the program code determines a standard result for the query (240). As illustrated in FIG. 1, program code that returns the standard query results can be part of an existing Q&A system. The program code analyzes one or more of the query and the standard result in view of the data structure and extracts elements from the query (and, optionally, and the standard result) relevant to one or more of the elements or the relationships in the data structure (250). In embodiments of the present invention, the program code analyzes the standard (raw) search results returned, responsive to the query, and interfaces with a text analysis technology to identify and expand upon the concept(s) returned in the raw search results. For example, the program code can obtain, via user entry, the question, "How old is John Smith?" When analyzing the question, the program code analyzes the core context of the question (e.g., segments related to how, what, where, and/or when). In the example of "How old is John Smith," the program code can identify "how old" and "John Smith" as segments upon which to focus the generation of contextual results.

In embodiments of the present invention, the program code can retrieve standard search results in parallel or consecutive to retrieving contextual search results. In these embodiments, responsive to obtaining a query, the program code, when discovering or searching for certain entity and its properties (responsive to the query), establishes a relationship between the discovered entity (the subject of the query) and entities of the same class, represented in the user's data structure (e.g., knowledge graph). Returning to the "John Smith" example, when determining the age of John Smith, a person, with the properties of age and education, the program code builds entity-relationship (ER) diagrams to represent the relationships the program code discovers through the entity-property relationships associated with the entity (e.g., John Smith) and its properties (e.g., age and education) from the data structure (e.g., personalized knowledge graph).

Referring to FIG. 2, based on extracted elements, the program code generates contextual search results responsive to the query (260). In some embodiments of the present invention, the program code identifies links between a user's profile (comprised by a data structure) and concepts the program code identified in the standard (raw) search results. The contextual results can be contextual to the user, as depicted in FIG. 3, or can be contextual based on elements of the question. Returning to the John Smith example, to provide contextual results for this question, in this example, the program code can search through the data that was previously collected and was related to the user. If the program code identifies another person, Mary Doe, per the data structure, who is familiar to the user, and who attended the high school and college at the same time as John Smith, and the program code determines that Mary Doe's age is already known (e.g., and stored in a central repository, FIG. 1, 180), the program code can provide contextual search results to the user, based on the relationship between John Smith and Mary Doe, and based on the user's familiarity with Mary Doe.

The program code transmits the contextual search results to the user (270). Thus, in some embodiments of the present invention, the program code presents effectively updated search results to a user by replacing or enhancing standard (raw) search results with the personalized meaningful information that user can easily comprehend. In some embodiments of the present invention, the program code generates the standard search results and the context for the contextual search results, in parallel. In some embodiments of the present invention, the program code generates a visual representation of the search results and the contextual search results and displays both sets of search results in a graphical user interface (GUI) on a computing device accessible to the user, including, but not limited to, the computing device from which the user initiated the query. Returning to the John Smith example, the program code can display the search results by intelligently applying Mary Doe's age information as the parallel answer to the question. In a GUI, the program code can display the standard (default) search results in an expected (standard, default) format, but add the knowledge that the user is familiar with, in this case, Mary Doe's age, and display that data to set some context for the search result. In some embodiments of the present invention, the program code displays the context in a popup tooltip format.

FIG. 4 is an example of how the program code can display standard search results and contextual search results responsive to the "How old is John Smith" query. In this example, in the GUI 400, the program code displays the initial question 410, (e.g., "Question: How old is John Smith?") the standard search results 420 (e.g., "John Smith is 46 years old."), and the contextual search results 430 (e.g., "John Smith is about the same age as Mary Doe as they attended college around the same time.").

In some embodiments of the present invention, the program code solicits feedback regarding the displayed results. For example, upon displaying the results, the program code can prompt a user, in the GUI, to respond to a prompt (e.g., "Was this helpful?") or otherwise indicate, whether a result and/or the context is helpful or relevant to the user. Based on obtaining an indication from a user regarding whether the results and context were helpful, the program code can update the data structure for use in future query responses. Thus, the program code is self-learning and can progressively tune contextual results based on updates to data structures.

Referring to FIG. 3, program code in some embodiments of the present invention obtains data from a post made about a user to a social media site; the post is an image of a user and the image was captured at a second user's event, in a given town, and in a given state (310). In some embodiments of the present invention, data accessed and utilized by the program code in providing search results can be controlled through privacy settings, both in the sources of external data, and/or in the query enhancing program code itself. For example, in some embodiments of the present invention, users can manipulate various controls that enables the program code to access social media photos posted by the user, with a given security level.

Returning to FIG. 3, program code analyzes the data in the post relevant to the user, generating a knowledge graph which includes an association of the user to the event of the second user, the given town, and the given state (320). The program code obtains a query from the user requesting a location of another town (330). The program code determines the location of the other town, as defined by geographic coordinates (e.g., a standard result) (340). The program code analyzes one or more of the query and the geographic coordinates in view of the knowledge graph and extracts elements from the query relevant to one or more of the elements or the relationships in the knowledge graph (e.g., the location relative to the event) (350). The program code generates a contextual search result which includes, based on the knowledge graph, the location of the other town and the information that the other town is a certain distance from the given town, where the second user's event took place (360). The program code transmits the contextual search results to the user (370). Assigning values to this example for illustrative purposes only, program code generates a knowledge graph which includes an association of the user to a party hosted by a second user at a specific venue in Manhattan in New York State. The first user makes an input into a computing resource (e.g., FIG. 1, 110), requesting a location of a restaurant in Brooklyn in New York State. The program code provides this first user with the location of the restaurant in terms of its proximity to the venue in Manhattan, where this first user attend the second user's party.

In some embodiments of the present invention, the program code transmits both the standard and the contextual search results to the user. In some embodiments of the present invention, the program code displays the contextual and the standard search results together in a GUI on a computing device accessible to the user. In some embodiments of the present invention, the program code solicits feedback from the user regarding the accuracy or general helpfulness of the contextual results. Based on the response, the program code can update the knowledge graph based on the feedback.

FIG. 3 utilizes a single post made to social media as a source of contextual results for the user, when the user invokes a search. However, based on the connectivity of multiple systems and the prevalence of Internet of Things (IoT) devices and other personal computing devices, the knowledge graph or other data structure that the program code can generate for a given user can be more extensive than the data available in a single image. For example, in some embodiments of the present invention, the program code can generate and continually update a data structure associated with a given user based on that user's digital wardrobe. In some embodiments of the present invention, the data structure can include various elements of a digital wardrobe of a given user or group or users that the program code can (cognitively) analyze when establishing the data structure. As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, IoT devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual, which can aid the program code in provided contextualized results that are not only personalized, but, possibly, unique to the user. In addition to identifying a user, data that comprises a digital wardrobe can be utilized to tailor additional applications, software, events, experiences, to fit the parameters and preferences to the user, based on extracting and analyzing this data from the user's digital wardrobe. In embodiments of the present invention, the program code can extract elements of a user's digital wardrobe to generate a data structure that the program code utilizes to provide customized (contextual) search results to the user.

Elements of a digital wardrobe for a given user can be accessed by one or more servers executing the program code of embodiments of the present invention, via a personal computing device utilized by the user to execute a query, via communications of the personal computing device with IoT devices. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device utilized by a user to execute a query) can identify the source of the information. Within the IoT, various devices can communicate with each other and can access data from sources available over various communication networks, including the Internet. Thus, based on communicating with the personal computing device of a user, program code executing on one or more servers can obtain digital wardrobe data from the personal computing device, to generate and update the data structure and therefore, to configure the contextual search results.

In some embodiments of the present invention, the program code utilizes a neural network to analyze user data and generate the data structures. Neural networks are a biologically-inspired programming paradigm which enable a computer to learn from observational data, in this case, data relevant to a user, including the digital wardrobe of a user and user profile data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning provide solutions to ingesting and organizing data from diverse sources. In fact, neural networks can be used to solve many problems in speech recognition and natural language processing.

Some embodiments of the present invention may utilize a neural network to predict additional attributes of a user, for inclusion in the data structure, based on the inputs provided. Utilizing the neural network, the program code can predict subsequent data. The program code obtains (or derives) the initial attributes from user profile, or a digital wardrobe, to generate an array of values (possible attributes) to input into input neurons of the neural network. Responsive to these inputs, the output neurons of the neural network produce an array that includes the identified attributes as well as the predicted attributes. The neural network can also be utilized to process the data of multiple users simultaneously, and in processing these data, the program code can generate and predict relationships between users for utilization in the data structures.

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation. IBM® is a registered trademark of International Business Machines Corporation, Armonk, N.Y., U.S.A.

Figure 5:
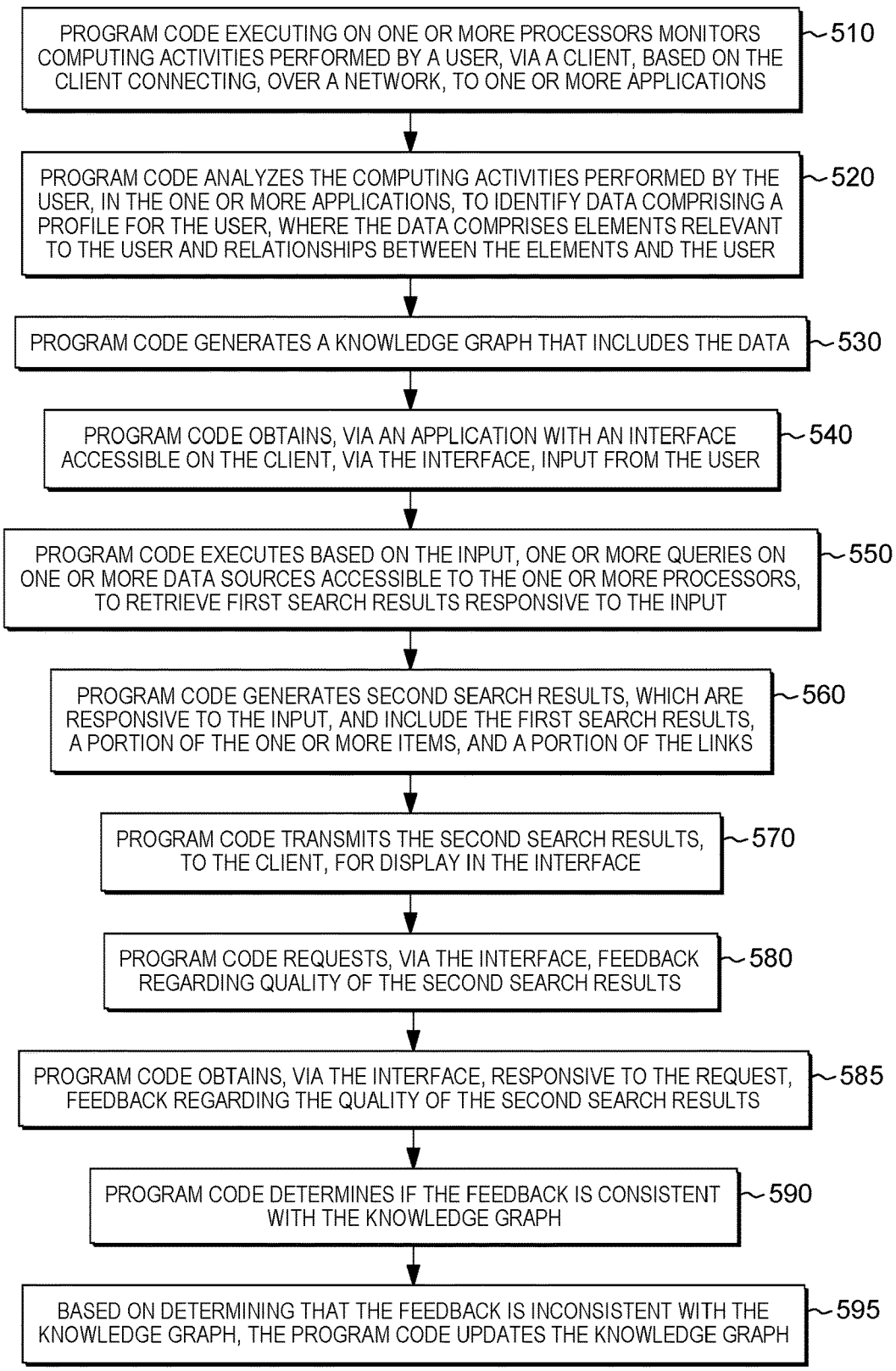
FIG. 5 is a workflow illustrating certain aspects of an embodiment of the present invention.

FIG. 5 is a workflow 500 that illustrates certain aspects of some embodiments of the present invention. In some embodiments of the present invention, program code executing on one or more processors monitors computing activities performed by a user, via a client, based on the client connecting, over a network, to one or more applications (510). The program code analyzes the computing activities performed by the user, in the one or more applications, to identify data comprising a profile for the user, where the data comprises elements relevant to the user and relationships between the elements and the user (520). The data can be understood as artifact information relevant to the user (e.g., age, hobbies, occupation, place of employment, and education). The elements relevant to the user can include, but are not limited to, entities, topics, activities, places, individuals, and/or identities. In some embodiments of the present invention, the monitoring and analysis is performed by the program code, subject to privacy settings configured by a user and/or an administrator. Additionally, the program code observes all privacy policies inherent in the applications being observed, in some embodiments of the present invention. Depending upon privacy policies implemented, the program code can monitor a variety of user activities in various applications. Applications can include, but are not limited to, social media sites. As explained above, in some embodiments of the present invention, program code generates its own user profile, based on observed user activities. However, in some embodiments of the present invention, the program code obtains user profile information from a user profile in an existing application, including but not limited to, a user profile on a social media site.

Returning to FIG. 5, the program code generates a knowledge graph that includes the data (530). In some embodiments of the present invention, to generate the knowledge graph, the program code queries one or more data sources, to obtain data defining properties of the elements and retains the properties in the knowledge graph. For example, the program code can learn that a user attended a specific educational institution, but can query further to learn the location of that educational institution. If relevant, the location of the educational institution (given the user's familiarity with the institution itself) can be integrated into relevant search results by the program code, to provide context.

The program code obtains, via an application with an interface accessible on the client, via the interface, input from the user (540). The program code executes based on the input, one or more queries on one or more data sources accessible to the one or more processors, to retrieve first search results responsive to the input (550). As illustrated in FIG. 1, the program code can execute this search on a variety of sources, depending upon the computing system into which aspects of embodiments of the present invention are implemented (e.g., database resources FIG. 1, 140, and external resources FIG. 1, 150, including publicly available websites).

The program code analyzes the input and the first search results to identify segments comprising the input and segments comprising the first search results relevant to one or more items comprising the data in the knowledge graph and, as part of this analysis, defines links between each item of the one or more items of the data in the knowledge graph and the identified segments (550). Each link can represent a relationship between the user, an item of the one or more items, and a segment of the segments comprising the first search results. Relationships can include connections between a user and an element and/or a connection between an element and another element.

The program code generates second search results, which are responsive to the input, and include the first search results, a portion of the one or more items, and a portion of the links (560). The program code transmits the second search results, to the client, for display in the interface (570). In some embodiments of the present invention, the program code displays the second search results in the interface.

In some embodiments of the present invention, the program code requests, via the interface, feedback regarding quality of the second search results (580). In these embodiments, the program code obtains, via the interface, responsive to the request, feedback regarding the quality of the second search results (585). The program code determines if the feedback is consistent with the knowledge graph (590). Based on determining that the feedback is inconsistent with the knowledge graph, the program code updates the knowledge graph (595).

Embodiments of the present invention include a computer-implemented method, a computer program product, and a computer system where program code executing of one or more processors monitors activities performed by a user, via a client, based on the client connecting, over a network, to one or more applications. The program code analyzes the computing activities performed by the user, in the one or more applications, to identify data comprising a profile for the user, where the data comprises elements relevant to the user and relationships between the elements and the user. The program code generates, based on the analyzing, a knowledge graph, where the knowledge graph comprises the data. The program code obtains, via an application with an interface accessible on the client, via the interface, an input from the user. The program code executes, based on the input, one or more queries on one or more data sources accessible to the one or more processors, to retrieve first search results responsive to the input. The program code analyzes the input and the first search results to identify segments comprising the input and segments comprising the first search results relevant to one or more items comprising the data in the knowledge graph, where the analyzing further comprises defining links between each item of the one or more items comprising the data in the knowledge graph and the identified segments. The program code generates search results, where the second search results are responsive to the input, and where the second search results comprise the first search results, a portion of the one or more items, and a portion of the links. The program code transmits the second search results, to the client for display in the interface.

In some embodiments of the present invention, the program code displays the second search results, in the interface.

In some embodiments of the present invention, each link of the portion of the links comprises a relationship between the user, an item of the one or more items, and a segment of the segments comprising the first search results.

In some embodiments of the present invention, the elements relevant to the user are selected from the group consisting of: entities, topics, activities, places, individuals, and identities.

In some embodiments of the present invention, each relationship of the relationships between each element of the elements is selected from the group consisting of: a connection between the user and the element, and a connection between the element and another element of the elements.

In some embodiments of the present invention, the one or more applications comprise a social media site and the profile for the user comprises the profile of the user on the social media site.

In some embodiments of the present invention, the data comprises artifact information relevant to the user.

In some embodiments of the present invention, the artifact information is selected from the group consisting of: age, hobbies, occupation, place of employment, and education.

In some embodiments of the present invention, generating the knowledge graph further comprises: the program code querying the one or more data sources, to obtain data defining properties of the elements; and the program code retaining the properties in the knowledge graph.

In some embodiments of the present invention, the second search results further comprise the properties of the one or more items.

In some embodiments of the present invention, the program code requests, via the interface, feedback regarding quality of the second search results.

In some embodiments of the present invention, the program code obtains via the interface, responsive to the requesting, feedback regarding the quality of the second search results. The program code determines if the feedback is consistent with the knowledge graph. Based on determining that the feedback is inconsistent with the knowledge graph, the program code updates the knowledge graph.

Figure 6:
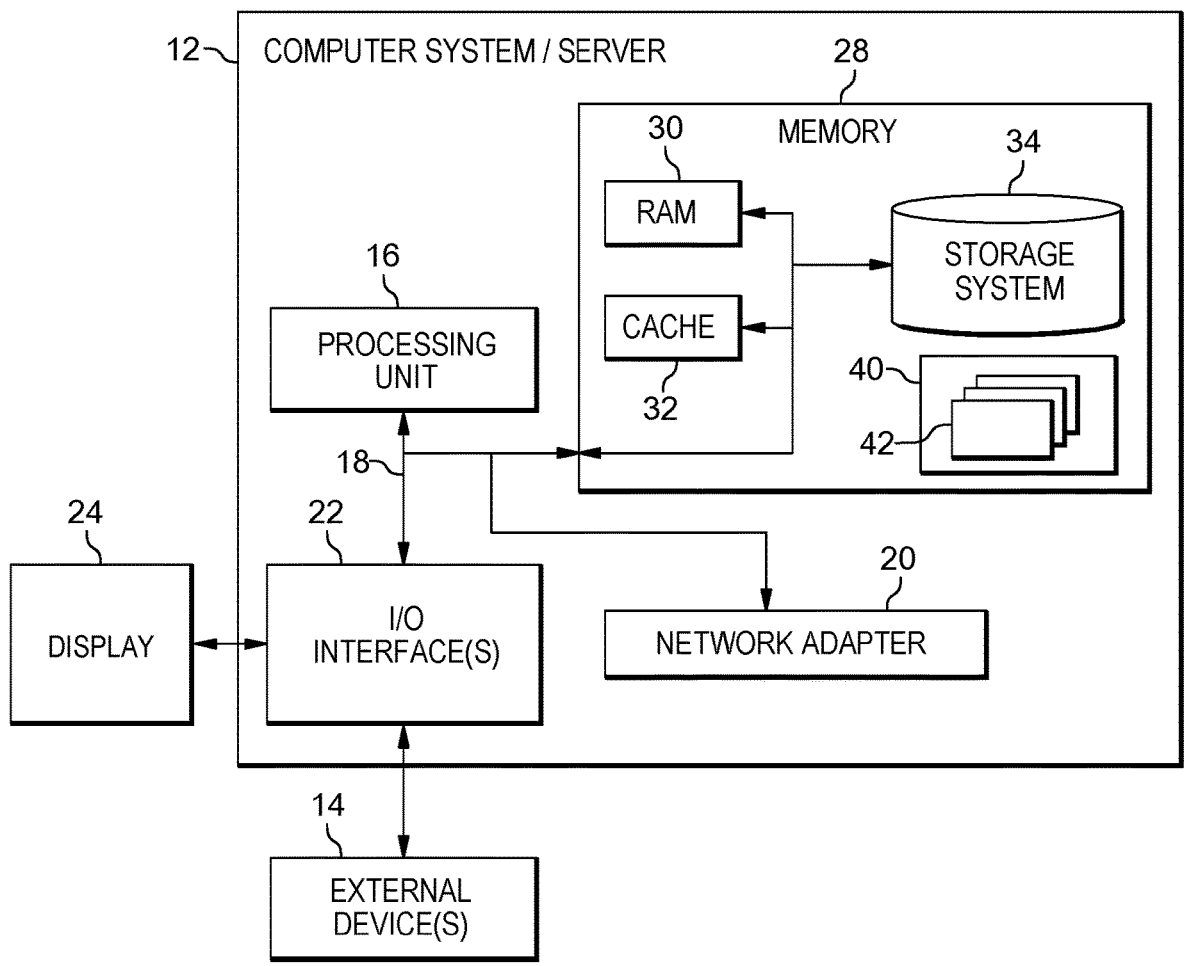
FIG. 6 depicts one embodiment of a computing node that can be utilized in a cloud computing environment.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more servers 120 (FIG. 1) executing the program code of the Q&A system 130, the database resources 140 (FIG. 1), the one or more servers 160 executing the query result enhancing program code 161 (FIG. 1), the central repository 180 (FIG. 1), and the computing node with the GUI 400 (FIG. 4), can each be understood as a cloud computing node 10 (FIG. 6) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
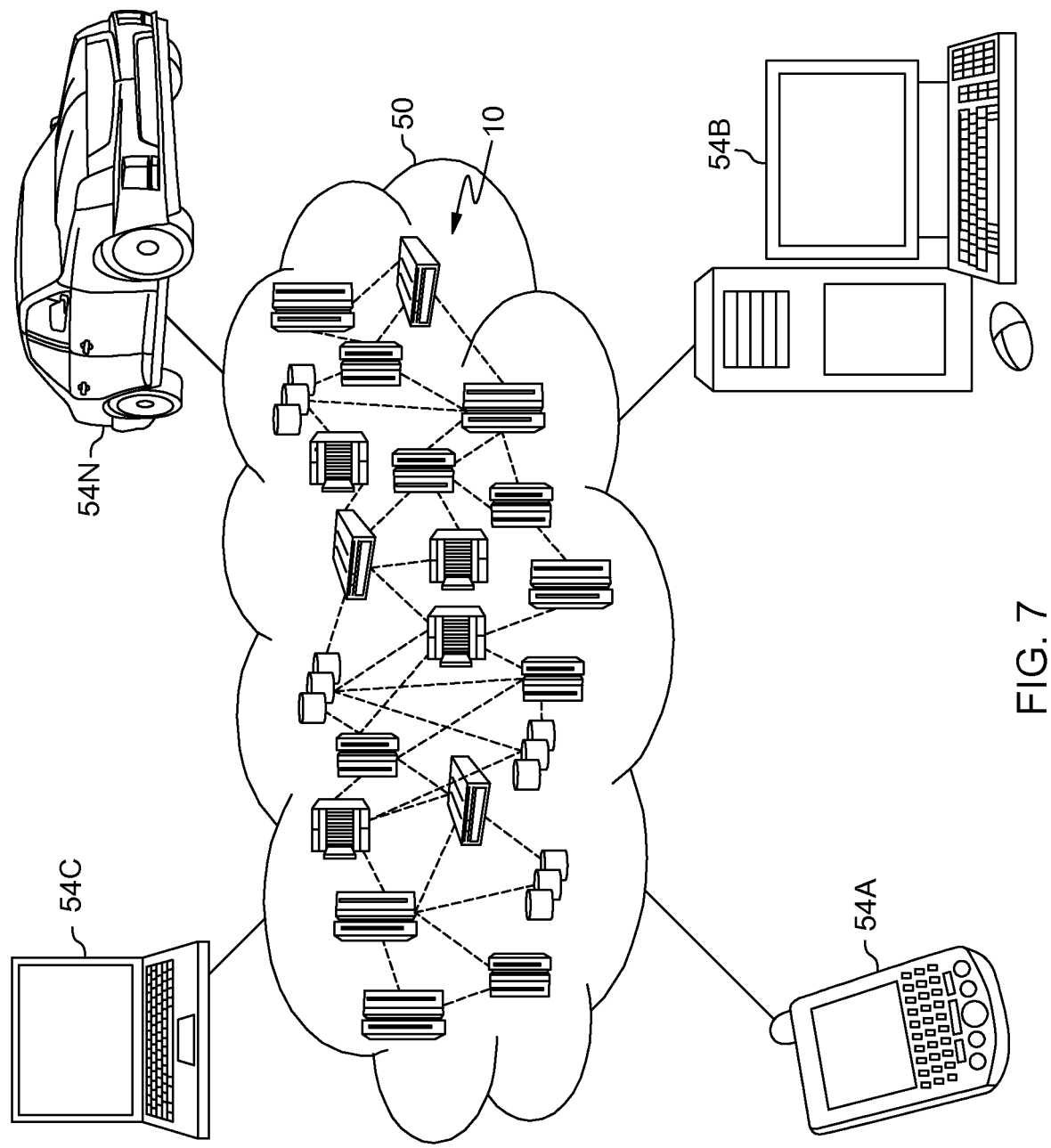
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
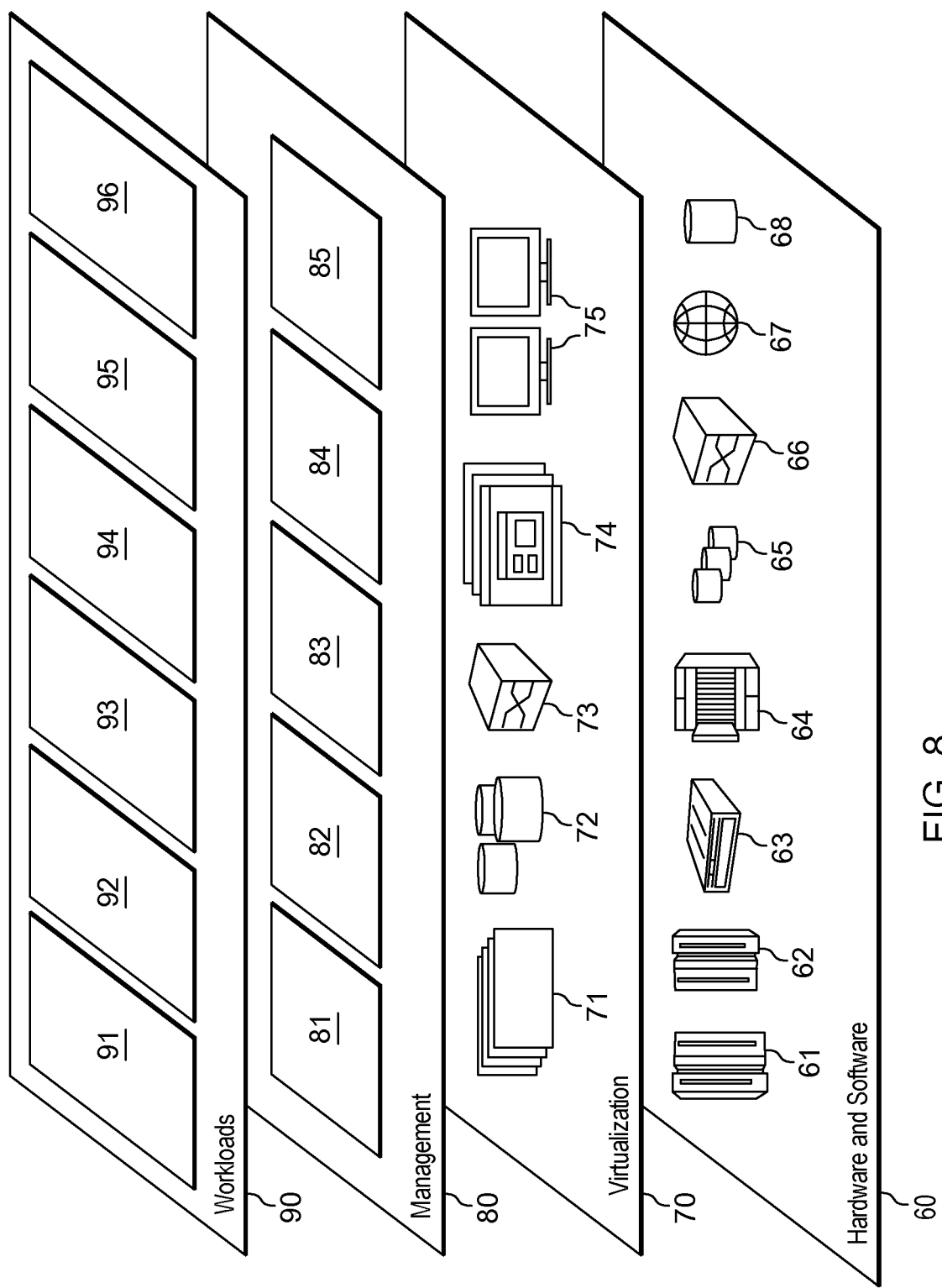
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing personalized search results 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   monitoring, by one or more processors, computing activities performed by a user, via a client, based on the client connecting, over a network, to one or more applications;
   analyzing, by the one or more processors, the computing activities performed by the user, in the one or more applications, to identify data comprising a profile for the user, wherein the data comprises elements relevant to the user and relationships between the elements and the user;
   generating, by the one or more processors, based on the analyzing, a knowledge graph, wherein the knowledge graph comprises the data;
   obtaining, by the one or more processors, via an application with an interface accessible on the client, via the interface, input from the user, the input comprising a search request;
   executing, by the one or more processors, based on the search request, one or more queries on one or more data sources accessible to the one or more processors, to retrieve first search results responsive to the search request;
   dynamically enhancing, by the one or more processors, the first search results, the dynamically enhancing comprising:
   analyzing, by the one or more processors, the input and the first search results to identify segments comprising the input and segments comprising the first search results relevant to one or more items comprising the data in the knowledge graph, wherein the analyzing further comprises defining links between each item of the one or more items comprising the data in the knowledge graph and the identified segments; and automatically generating, by the one or more processors, enhanced first search results comprising second search results, wherein the second search results are responsive to the search request, and wherein the second search results comprise the first search results, a portion of the one or more items, and a portion of the links; and transmitting, by the one or more processors, the second search results, to the client.

2. The computer-implemented method of claim 1, further comprising:

displaying, by the one or more processors, the transmitted second search results, in the interface of the client.

3. The computer-implemented method of claim 2, further comprising:

requesting, by the one or more processors, via the interface, feedback regarding quality of the second search results.

4. The computer-implemented method of claim 3, further comprising:

obtaining, by the one or more processors, via the interface, responsive to the requesting, feedback regarding the quality of the second search results;

determining, by the one or more processors, if the feedback is consistent with the knowledge graph; and based on determining that the feedback is inconsistent with the knowledge graph, updating, by the one or more processors, the knowledge graph.

5. The computer-implemented method of claim 1, wherein each link of the portion of the links comprises a relationship between the user, an item of the one or more items, and a segment of the segments comprising the first search results.

6. The computer-implemented method of claim 1, wherein the elements relevant to the user are selected from the group consisting of: entities, topics, activities, places, individuals, and identities.

7. The computer-implemented method of claim 6, wherein each relationship of the relationships between each element of the elements is selected from the group consisting of: a connection between the user and the element, and a connection between the element and another element of the elements.

8. The computer-implemented method of claim 1, wherein the one or more applications comprise a social media site and the profile for the user comprises the profile of the user on the social media site.

9. The computer-implemented method of claim 1, wherein the data comprises artifact information relevant to the user.

10. The computer-implemented method of claim 9, wherein the artifact information is selected from the group consisting of: age, hobbies, occupation, place of employment, and education.

11. The computer-implemented method of claim 1, wherein generating the knowledge graph further comprises:

querying, by the one or more processors, the one or more data sources, to obtain data defining properties of the elements; and retaining, by the one or more processors, the properties in the knowledge graph.

12. The computer-implemented method of claim 1, wherein the second search results further comprise the properties of the one or more items.

13. A computer program product comprising:

a computer readable storage medium readable by one or more processors and storing instructions for execution by the one or more processors for performing a method comprising:

monitoring, by the one or more processors, computing activities performed by a user, via a client, based on the client connecting, over a network, to one or more applications;

analyzing, by the one or more processors, the computing activities performed by the user, in the one or more applications, to identify data comprising a profile for the user, wherein the data comprises elements relevant to the user and relationships between the elements and the user;

generating, by the one or more processors, based on the analyzing, a knowledge graph, wherein the knowledge graph comprises the data;

obtaining, by the one or more processors, via an application with an interface accessible on the client, via the interface, input from the user, the input comprising a search request;

executing, by the one or more processors, based on the search request, one or more queries on one or more data sources accessible to the one or more processors, to retrieve first search results responsive to the search request;

dynamically enhancing, by the one or more processors, the first search results, the dynamically enhancing comprising:

analyzing, by the one or more processors, the input and the first search results to identify segments comprising the input and segments comprising the first search results relevant to one or more items comprising the data in the knowledge graph, wherein the analyzing further comprises defining links between each item of the one or more items comprising the data in the knowledge graph and the identified segments; and automatically generating, by the one or more processors, enhanced first search results comprising second search results, wherein the second search results are responsive to the search request, and wherein the second search results comprise the first search results, a portion of the one or more items, and a portion of the links; and transmitting, by the one or more processors, the second search results, to the client.

14. The computer program product of claim 13, the method further comprising:

displaying, by the one or more processors, the transmitted second search results, in the interface of the client.

15. The computer program product of claim 13, wherein each link of the portion of the links comprises a relationship between the user, an item of the one or more items, and a segment of the segments comprising the first search results.

16. The computer program product of claim 13, wherein the elements relevant to the user are selected from the group consisting of: entities, topics, activities, places, individuals, and identities.

17. The computer program product of claim 16, wherein each relationship of the relationships between each element of the elements is selected from the group consisting of: a connection between the user and the element, and a connection between the element and another element of the elements.

18. The computer program product of claim 13, wherein the one or more applications comprise a social media site and the profile for the user comprises the profile of the user on the social media site.

19. The computer program product of claim 13, wherein the data comprises artifact information relevant to the user.

20. A system comprising:

a memory;

one or more processors in communication with the memory;

program instructions executable by the one or more processors via the memory to perform a method, the method comprising:

monitoring, by the one or more processors, computing activities performed by a user, via a client, based on the client connecting, over a network, to one or more applications;

analyzing, by the one or more processors, the computing activities performed by the user, in the one or more applications, to identify data comprising a profile for the user, wherein the data comprises elements relevant to the user and relationships between the elements and the user;

generating, by the one or more processors, based on the analyzing, a knowledge graph, wherein the knowledge graph comprises the data;

obtaining, by the one or more processors, via an application with an interface accessible on the client, via the interface, input from the user, the input comprising a search request;

executing, by the one or more processors, based on the search request, one or more queries on one or more data sources accessible to the one or more processors, to retrieve first search results responsive to the search request;

dynamically enhancing, by the one or more processors, the first search results, the dynamically enhancing comprising:

analyzing, by the one or more processors, the input and the first search results to identify segments comprising the input and segments comprising the first search results relevant to one or more items comprising the data in the knowledge graph, wherein the analyzing further comprises defining links between each item of the one or more items comprising the data in the knowledge graph and the identified segments; and automatically generating, by the one or more processors, enhanced first search results comprising second search results, wherein the second search results are responsive to the search request, and wherein the second search results comprise the first search results, a portion of the one or more items, and a portion of the links; and transmitting, by the one or more processors, the second search results, to the client.

* * * * *